United States Patent [19]

Shimizu

[11] Patent Number: 4,918,744
[45] Date of Patent: Apr. 17, 1990

[54] MOTOR-DRIVEN POWER STEERING UNIT
[75] Inventor: Yasuo Shimizu, Wako, Japan
[73] Assignee: Honda Giken Kogyo Kabushiki Kaisha, Tokyo, Japan
[21] Appl. No.: 204,326
[22] Filed: Jun. 9, 1988
[30] Foreign Application Priority Data
  Jul. 1, 1987 [JP] Japan ................. 62-164777
[51] Int. Cl.⁴ ............................ G05B 5/00
[52] U.S. Cl. .................... 388/833; 361/31; 180/79.1; 318/646
[58] Field of Search ............ 361/23–24, 361/31–33; 180/141–142, 79.1; 318/332–333, 326–328, 646, 648; 388/209, 815, 823, 833; 364/424.01, 424.03, 424.1

[56] References Cited
U.S. PATENT DOCUMENTS

| | | | |
|---|---|---|---|
| 4,532,567 | 7/1985 | Kade | 361/31 |
| 4,547,715 | 10/1985 | Li | 318/331 |
| 4,611,682 | 9/1986 | Yasuda et al. | 361/24 |
| 4,681,182 | 7/1987 | Suzuki et al. | 180/79.1 |
| 4,708,220 | 11/1987 | Noto et al. | 180/79.1 |
| 4,753,308 | 6/1988 | Noto et al. | 180/79.1 |
| 4,771,843 | 9/1988 | Shimizu | 180/142 |
| 4,771,845 | 9/1988 | Shimizu | 361/24 |
| 4,789,040 | 12/1988 | Morishita et al. | 361/24 |
| 4,809,173 | 2/1989 | Fukami et al. | 180/79.1 |

Primary Examiner—William M. Shoop, Jr.
Assistant Examiner—David Martin
Attorney, Agent, or Firm—Armstrong, Nikaido, Marmelstein, Kubovcik & Murray

[57] ABSTRACT

The motor-driven power steering unit according to the first aspect of the present invention is able to decrease the amount of current being applied to the motor if the steering force exceeds a predetermined level. The motor-driven power steering unit according to the second aspect of the present invention is able to decrease the amount of current being applied to the motor when the steering speed is less than a predetermined level.

2 Claims, 9 Drawing Sheets

MOTOR-DRIVEN POWER STEERING UNIT

FIELD OF THE INVENTION

The present invention relates to a motor-driven power steering unit which assists steering by means of an auxiliary steering force produced from an electric motor. More particularly, the present invention relates to a motor-driven power steering unit which protects an electric motor by decreasing an electric current being applied to the motor when a load on the motor becomes excessive such as when a steering resistance is increased.

BACKGROUND OF THE INVENTION

A motor-driven power steering unit imparts a motor-generated auxiliary steering force to a steering force transmission system. This unit controls an electric current being supplied to the electric motor based upon steering information such as an angle through which a steering wheel is turned, the steering speed and the steering force or the speed of the vehicle. An auxiliary steering force generated from the motor as well as a manual steering force being applied to the wheel is allowed to act on the vehicle's wheels via a transmission means such as a steering gear mechanism so as to steer the vehicle's wheels. For a rack-and-pinion power steering unit, the manual steering force and the auxiliary steering force are allowed to act on the rack so as to move it from its neutral position to either of a rightward axial direction or a leftward axial direction. This motion of the rack is transmitted to vehicle's wheels via the transmission means such as the tie rod, thereby steering the vehicle's wheels.

In the motor-driven power steering unit generally described above, either the rightmost or leftmost position to which the rack is permitted to move (this position is hereunder referred to as a maximum steering angular position) is limited by bringing the rack into contact with a fixed reference part such as a gear-case. This is done in order to ensure that the rack will not move beyond its maximum steering angular position and so that the steering wheel will not be turned in a direction to cause the rack to be moved beyond its maximum steering angular position. Therefore, if the rack is at its maximum steering angular position (or stated more simply, when it is at the maximum steering angle), there is no need to impart the motor-generated auxiliary steering force to the rack. Rather, it is desired to limit the auxiliary steering force being produced by the motor so as to reduce its power consumption.

To meet this need, an improved motor-driven power steering unit has been proposed, as described above, in Japanese Utility Model Laid-Open Publication No. 193868/1985. This steering unit has a microswitch mounted in a gear-case for detecting the maximum steering angular position of the rack. The auxiliary steering force generated from the motor is decreased when the rack is found to be at its maximum steering angular position on the basis of an output from the microswitch.

However, the prior art motor-driven power steering unit described above has a disadvantage because a wire harness must be provided between the microswitch, in the gear-case, and the control unit which is very distant from the switch. Thus, the wiring needed to install the switch will be cluttered which adds to the complexity of the overall design of the steering unit. Furthermore, installing a microswitch, in the prior art motor-driven power steering unit, requires a considerable amount of precision in the position of installation. Thus, the number of steps involved in assembly operations is unavoidably increased which leads to a higher manufacturing cost.

SUMMARY OF THE INVENTION

The present invention has been accomplished in order to solve the aforementioned problems of the prior art. An object, therefore, of the present invention is to provide a motor-driven power steering unit that can be manufactured at a low cost because of its simple composition and which does not make the steering any heavier while ensuring a reduction in power consumption when the wheel is turned to the maximum steering angle.

Figure 1A:
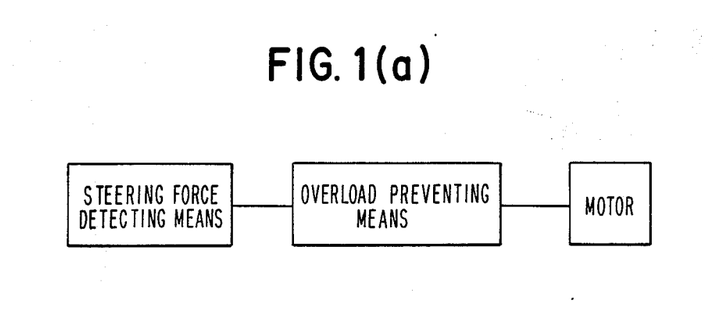
FIG. 1(a) is a block diagram showing the composition of the motor-driven power steering unit according to the first aspect of the present invention.

The present invention takes two different approaches to attaining the above-stated object. According to one aspect of the present invention, which is shown in a block diagram in FIG. 1(a), there is provided a motor-driven power steering unit furnished with an electric motor for generating an auxiliary steering force in a steering system that couples a steering wheel to vehicle's wheels. The steering unit assists in the turning of the steering wheel by controlling an electric current to be applied to the motor on the basis of steering information. The steering unit comprises a steering force detecting device for detecting the steering force generated in the steering system, and an overload preventing device for decreasing the electric current being applied to the motor when the steering force, detected by the steering force detecting device, exceeds a predetermined value.

Figure 1B:
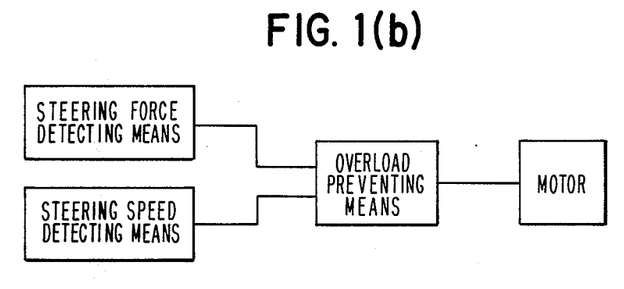
FIG. 1(b) is a block diagram showing the composition of the motor-driven power steering unit according to the second aspect of the present invention.

According to another aspect of the present invention, which is shown in a block diagram in FIG. 1(b), there also is provided a motor-driven power steering unit furnished with an electric motor for generating an auxiliary steering force in a steering system that couples the steering wheel to vehicle's wheels. The steering unit assists in the turning of the steering wheel by controlling an electric current to be applied to the motor on the basis of steering information. The steering unit comprises a steering force detecting device for detecting the steering force generated in the steering system, a steering speed detecting device for detecting the steering speed produced by the steering system, and an overload preventing device for decreasing the electric current being applied to the motor when the steering force, detected with the steering force detecting device, exceeds a predetermined value and when the steering speed detected with the steering speed detecting device is not higher than a predetermined value.

When a steering force exceeds a predetermined value, such as a) where the driver turns the wheel in a direction beyond a maximum steering angular position when the rack is already at the maximum steering angle or b) where a certain obstacle on a road prevents steering the vehicle's wheels, a motor-driven power steering unit according to the first aspect of the present invention reduces the electric current being applied to the motor and prevents more than a necessary amount of current from flowing into the motor, thereby achieving a reduction in the power consumption. Since most motor-driven power steering units are furnished with a device for detecting the steering force, which is indispensable steering information for the purpose of controlling the motor, the steering unit according to the first aspect of the present invention can be manufactured at a low cost by making use of an already available steering force detecting device. In addition, the steering force detecting device is installed at a position close to control units such as a steering shaft, so wiring can be installed in an uncluttered way, thereby realizing a simplified circuit configuration.

In a motor-driven power steering unit according to the second aspect of the present invention, such as when steering of the wheels of the vehicle is impossible, the current being applied to the motor is reduced when the steering force exceeds a predetermined value and when the steering speed has dropped below a predetermined value. The present invention enables a more reliable and rapid detection of when steering is impossible, thereby accomplishing a further reduction in the power consumed.

BRIEF DESCRIPTION OF THE DRAWINGS

FIGS. 2 to 4 show a motor-driven power steering unit according to one embodiment of the first aspect of the present invention, in which

FIGS. 5 to 7 show motor-driven power steering units according to four embodiments of the present invention, in which

DESCRIPTION OF THE PREFERRED EMBODIMENTS

Figure 2:
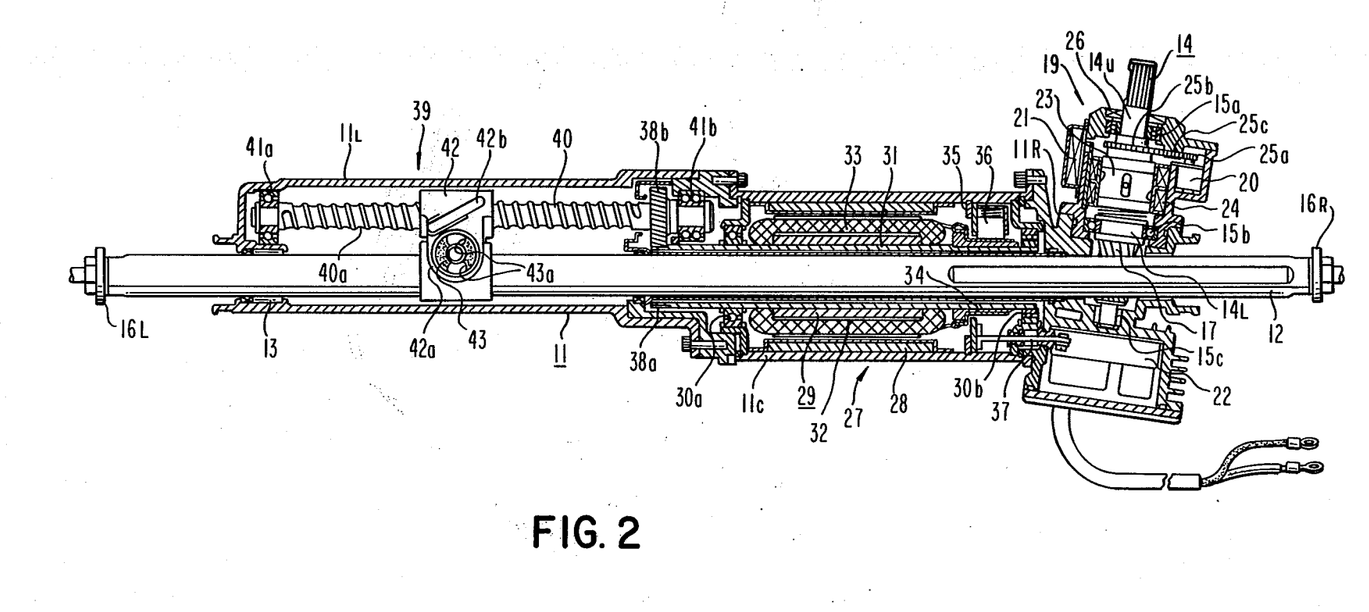
FIG. 2 is a longitudinal section of the physical mechanism of the steering unit.
Figure 3:
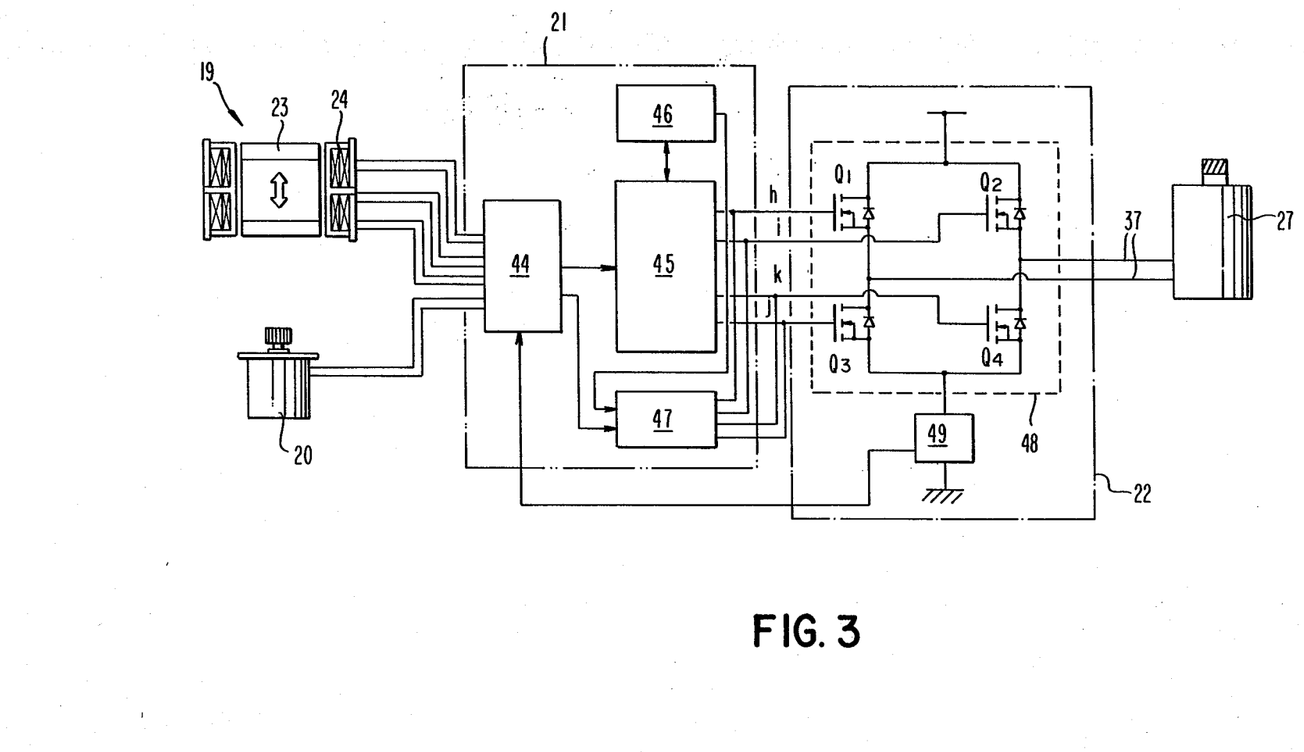
FIG. 3 is a block diagram of an electric circuit for the steering unit.
Figure 4:
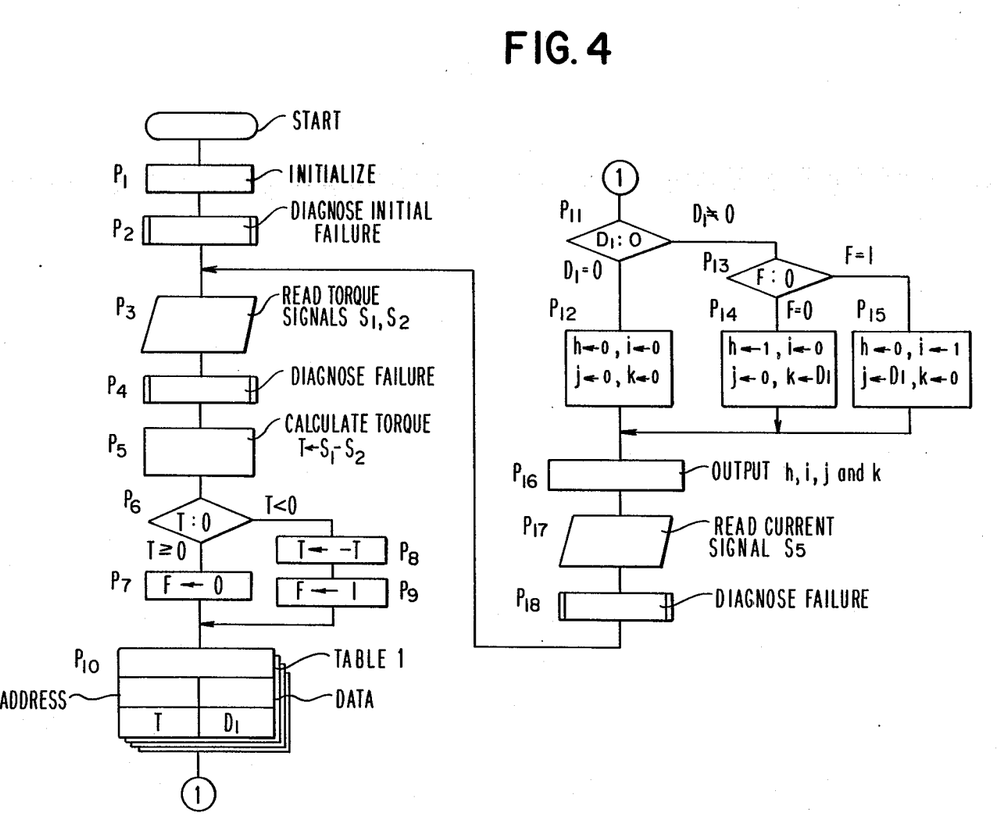
FIG. 4 is a flowchart showing the operation of the unit.

FIGS. 2 to 4 show a motor-driven power steering unit according to an embodiment of the first aspect of the present invention. FIG. 2 is a longitudinal section of the physical mechanism of the unit. FIG. 3 is a block diagram of an associated electric circuit. FIG. 4 is a flowchart showing the operation of the unit.

In FIG. 2, a gear-case 11 mounted on the body of a vehicle (not shown) consists of a generally cylindrical center case 11c which is fitted with two side cases 11L and 11R. The gear-case 11 supports a rack shaft 12, extending in the direction of the width of the vehicle, so as to be slidable in the axial direction, through a bush 13 provided at the left end of the gear-case 11. In the right side case 11R, a pinion shaft 14 is rotatably supported via bearing 15a, 15b and 15c. The back side of the right-hand portion of the rack shaft 12 is provided with teeth over a distance of travel corresponding to the range of angles through which vehicle's wheels can be steered. Flanged stoppers 16L and 16R are fixed on the projecting ends of the gear-case 11 in such a way that they can contact the outer surface of the gear-case 11. These stoppers 16L and 16R determine a maximum steering angular position by contacting the ends of the gear-case 11. As is well known, the rack shaft 12 is coupled, at its opposite ends, to knuckle arms on the vehicle's wheels via a steering cage such as a tie rod. The pinion shaft 14 is composed of an upper shaft 14U and a lower shaft 14L that are coupled together coaxially by means of a torsion bar (not shown) in such a manner that they are able to make a predetermined relative pivotal displacement with respect to one another. The upper shaft 14U is coupled to the steering wheel via a connecting means such as a steering shaft. The lower shaft 14L is furnished with a fixed pinion gear 17 that engages the teeth of the rack shaft 12. FIG. 2 also shows a dust seal 26.

The side case 11R of the gear-case 11 contains in the its interior a steering torque sensor (i.e., steering force detecting means) 19, a tachometer generator (i.e., steering speed detecting means) 20, and a control circuit 21 (to be described later). These are all positioned around the pinion shaft 14. A drive circuit 22, to be described later, is installed beneath the pinion shaft 14. The steering torque sensor 19 has a generally cylindrical movable iron core 23 through which the pinion shaft 14 is passed. A differential transformer 24 is placed around the iron core 23. The iron core 23 is coupled to the upper shaft 14U and the lower shaft 14L of the pinion shaft 14 via a cam mechanism. The iron case 23 undergoes axial displacement in proportion to the relative pivotal displacement of the upper and lower shafts 14U and 14L caused by an elastic torsional deformation of the torsion bar. The principal components of the differential transformer 24 are a primary coil, two secondary coils and a compensating tertiary coil. These coils are connected to the control circuit 21. When an ac signal is applied to the primary coil from the control circuit 21, the movable iron core 23 is displaced and the ac signals induced in the two secondary coils, in accordance with that displacement, is supplied to the control circuit 21 as a steering torque detection signal. The tachometer generator 20 has a gear 25a fixed on its rotating shaft. A gear 25b fixed on the pinion shaft 14 meshes the gear 25a via an idler gear 25c supported in the case 11. The tachometer generator 20 is a generator that is connected to the control circuit 21. The tachometer generator 20 supplies the control circuit 21 with a signal having a potential and a polarity (direction) that depend on the rotational speed (or steering speed) of the pinion shaft 14.

The gear-case 11 contains in the center case 11c, an electric motor 27 which is constructed coaxially with the rack shaft 12. The electric motor 27 has a field magnet 28 fixed in the center case 11c and a rotor 29 that is disposed coaxially with the rack shaft 12 between the field magnet 28 and the rack shaft 12. The rotor 29 has a cylindrical output shaft 31 rotatably supported on bearings 30a and 30b, a laminated iron core 32 having skewed grooves and an armature winding 33. The many turns of coil of the armature winding 33 are fixed coaxially around the output shaft 31 to provide a unitary assembly. The armature winding 33 is connected to the drive circuit 22 by wiring 37 via a commutator 34, fixed on the output shaft 31, and a brush 36, that is accommodated in a holder 35. The brush 36 makes elastic contact with the commutator 34. The motor 27 has a small-diameter gear 38a fixed to the periphery of the left end of the output shaft 31. The gear 38a meshes with a large-diameter gear 38b which is fixed on screw shaft 40 in a ball screw mechanism 39.

The screw shaft 40 is rotatably supported in the left side case 11L by means of bearings 41a and 41b in such a way that it extends parallel to the rack shaft 12 with the large-diameter gear 38b fixed at its right end. The screw shaft 40 has spiral grooves 40a which are formed in its outer surface and which extend the same distance as that of the travel of the rack shaft 12. The spiral grooves 40a make threadable engagement with a ball nut 42 via a number of balls (not shown) that are capable of circulation in the ball nut. The ball nut 42 has a pair of lugs 42a that extend downward on both sides of the rack shaft 12. Each of the lugs 42a is secured to the rack shaft 12 via an elastic bush 43 by means of a bolt (not shown) so as to form a unitary assembly. The elastic bush 43 has holes 43a on both sides in a direction perpendicular to the direction in which the rack shaft 12 extends. Thus, the bush 43 has a small spring constant in the perpendicular direction which reduces vibrational transmission occurring in that direction. The ball nut 42 is permitted to move only in combination with the rack shaft 12 in its axial direction as the screw shaft 40 rotates. A ball tube, for permitting circulation of balls, is designated by 42b in FIG. 2.

As FIG. 3 shows, the principal components of the control circuit 21 are an interface circuit 44, a microcomputer circuit 45, an accessory circuit 46 and a backup circuit 47, which are interconnected to one another. The interface circuit 44 has components such as a filter circuit, and A/D converter, and an ac signal output circuit. The interface circuit 44 is connected to various sensors such as the already mentioned steering torque sensor 19 and tachometer generator 20, as well as a current detector 49 to be described later. The interface circuit 44 supplies an ac signal to the primary coil in the steering torque sensor 19 and receives the ac signals produced from the two secondary coils. On the basis of the received ac signals, the interface circuit 44 outputs steering torque representing signals S1 and S2 to both the microcomputer circuit 45 and the backup circuit 47. On the basis of the output signal from the tachometer generator 20, the interface circuit 44 also outputs steering speed representing signals S3 and S4 to both the microcomputer circuit 45 and the backup circuit 47. On the basis of the output signal from the current detector 49, the interface circuit 44 also outputs a signal S5 that represents the level of an electric current applied to the motor 27. The accessory circuit 46 comprises a constant-voltage circuit and a crystal oscillator circuit or the like. The constant-voltage circuit supplies a constant-voltage power to each of the circuits. The crystal oscillator circuit outputs a reference clock pulse signal to the microcomputer circuit 45.

The microcomputer circuit 45 processes signals S1, S2, S3 and S4 from the interface circuit 44 in accordance with a program stored in a memory device such as a ROM, and outputs pulse width modulated (PWM) signals h, i, j and k to the drive circuit 22. The backup circuit 47 is connected to the drive circuit 22. If the microcomputer circuit 45 does not operate for some reason, the backup circuit 47 is used in place of the microcomputer circuit 45. The backup circuit 47 then supplies the drive circuit 22 with signals in response to the output signals S1, S2, S3 and S4 from the steering torque sensor 19 and the tachometer generator 20, thereby reducing the output of the motor 27 until the motor comes to a stop.

The principal components of the drive circuit 22 are a switch circuit 48 and the current detector 49. The switch circuit 48 is composed of four field-effect transistors (FET) Q1, Q2, Q3 and Q4 connected in the form of a bridge circuit. The four gates of FETs Q1, Q2, Q3 and Q4 are connected to the microcomputer 45. The switch circuit 48 is connected to a power supplying battery through the drain terminals of FETs Q1 and Q2. The source terminals of FETs Q3 and Q4 are grounded. The source terminals of Q1 and Q2 are respectively connected to the drain terminals of Q3 and Q4. The motor 27 is connected between the junction of the source terminal of Q1 and the drain terminal of Q3 and the junction of the source terminal of Q2 and the drain terminal of Q4. The gates of Q1, Q2, Q3 and Q4 are respectively supplied with PWM signals h, i, j, and k in such a way that either Q1/Q4 or Q2/Q3 are selectively driven together to control the direction and duty factor (current value) of the current to be applied to the motor 27. For the sake of convenience, the following explanation assumes that FETs Q1 and Q4, driven by PWM signals h and k, supply the motor 27 with an electric current that causes the output shaft 31 to rotate clockwise, whereas FETs Q2 and Q3 supply the motor 27 with a current that causes the output shaft 31 to rotate counterclockwise.

The operation of the motor-driven power steering unit according to the embodiment is hereunder described with reference to a flowchart shown in FIG. 4.

When an ignition key switch is turned on, the microcomputer circuit 45, in the steering unit, starts to control the driving of the motor 27 by repeatedly executing data processing according to the step sequence shown in the flowchart of FIG. 4.

In step P1, the microcomputer 45 is initialized to perform operations such as erasing and addressing of data stored in the internal register. Subsequently, in step P2, any initial failure in the microcomputer circuit 45 and other circuits is diagnosed in accordance with a predetermined subroutine. If, in the step P2, a certain device, for example, the microcomputer circuit 45 is found to be inoperable, the backup circuit 47 outputs substitute signals to the drive circuit 22, which reduces the output of the motor 27 until it comes to a stop.

Figure 8:
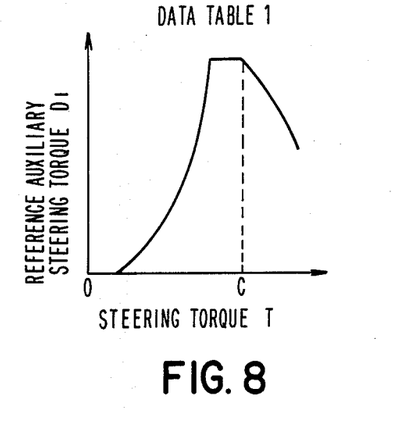
FIGS. 8-17 are graphs showing the working concepts employed in performing control and processing operations in the four embodiments of the present invention.

In the next step P3, the microcomputer circuit 45 reads output signals S1 and S2 from the two secondary coils of the differential transformer 24 in the steering torque sensor 19. In a subsequent step P4, any failure in the steering torque sensor 19 is diagnosed in accordance with a predetermined subroutine. Only when the sensor 19 is found to be functioning normally in step P4, does the sequence go to the next step P5. In step P5, output signals S1 and S2, of opposite polarity from the two secondary coils in the torque sensor 19, are subjected to arithmetic processing to generate a steering torque representing a signal T (hereunder referred to as steering torque T). The steering torque T is either positive or negative depending upon the direction in which the steering torque acts. The absolute value of the signal signifies the magnitude of the steering torque. In step P6, a decision is made as to whether the steering torque T is positive or negative. If it is positive or zero, flag F is set to zero "0" in step P7. If the steering torque T is negative, the steering torque T is subjected to a sign inverting processing (conversion to the absolute value, step P8) and flag F is set to one "1" (step P9). Flag F indicates the direction in which the steering torque T acts. For instance, if it is "0", the direction is clockwise and if it is "1", the direction is counteclockwise. Subsequently in step P10, a reference auxiliary steering torque D1 is looked up in a data table 1 (see FIG. 8) using the absolute value of the steering torque T as an address. An internal signal representing the reference auxiliary steering torque (this signal is hereunder referred to as reference auxiliary steering torque D1) is generated. The reference auxiliary steering torque D1 represents the duty factor of the current being applied to the motor 27, or the torque (auxiliary steering force) to be produced from the motor 27. As seen from FIG. 8, the reference auxiliary steering torque D1 decreases gradually in the region where the steering T exceeds a certain value C. Therefore, if, as a result of processing in steps P12 to P16 to be described later, the steering torque T exceeds the predetermined value C, the duty factor of the current (or its level) being applied to the motor 27 will decrease. This offers the following advantages: if the steering torque is increased a) as a result of turning the wheel in a direction beyond the maximum steering angular position in spite of the fact that the stoppers 16L and 16R on the rack shaft 12 have contacted the ends of the gear-case 11 to bring the rack shaft 12 to its maximum steering angular position, or b) where the steering torque is increases as a result of turning the wheel in spite of the fact that vehicle's wheels cannot be steered because of contact with an obstacle on the road, the power consumption of the motor 27 is reduced and at the same time, the amount of heat generated from the motor 27 and other devices can be minimized.

Subsequently, in step P11, a decision is made as to whether the reference auxiliary steering torque D1 is zero or not. If the reference auxiliary steering torque D1 is zero, the duty factors of all of the PWM signals h, i, j and k are set to "0" in step P12. If the reference auxiliary steering torque D1 is not zero, the value of flag F is determined in step P13. If the value of flag F is found to be zero in step P13, the PWM signals h, i, j and k are set to values 1, 0, 0 and D1, respectively, in step P14. If the value of flag F is found to be "1", the PWM signals h, i, j and k are set to values, 0, 1, D1 and 0, respectively, in step P15. In the next step P16, the processed PWM signals h, i, j and k are output to the drive circuit 22. Subsequently, in step P17, the value of current being applied to the motor 27 is read. In step P18, failure diagnosis is performed in accordance with a predetermined subroutine. Subsequently, the sequence returns to step P3 and the processing steps described above are repeated. Therefore, the motor 27 outputs an auxiliary torque depending upon the reference auxiliary steering torque D1. The auxiliary torque is transmitted to the rack shaft 12 via the ball screw mechanism 39. The transmitted torque is combined with the manual steering force exerted upon the wheel and the combined torque acts upon vehicle's wheels to steer them.

As already mentioned, if the steering torque is increased as a result of turning the wheel in a direction beyond the maximum steering angular position in spite of the fact that the rack shaft 12 has reached its maximum steering angular position, or where the steering is increased as a result of turning the wheel in spite of the fact that vehicle's wheels cannot be steered, the value of current being applied to the motor 27 is limited in the motor-driven power steering system according to the embodiment described above. As a result, the power consumption of the motor 27 is reduced and the heat generated from the motor 27 is also decreased. Unlike the steering unit described in Japanese Utility Model Laid-Open Publications No. 193868/1985, the steering unit of this embodiment has no need to install a separate microswitch. Therefore, wiring and hence the overall composition of the steering unit can be simplified. As a further advantage, the steering unit of the present invention can be manufactured at a low cost by utilizing already available devices as steering torque sensor 16 and other components.

In the embodiment described above, the amount of current being applied to the motor 27 is decreased in the range where the steering torque T exceeds the predetermined value. If desired, a hysteresis may be provided in such a way that the level of current being applied to the motor 27 is limited when the steering torque T exceeds a comparatively large value C1 and normal control is restored when the current level drops below a certain value C2 which is smaller than C1. Alternatively, a time-associated control may be performed in such a way that the amount of current being applied to the motor 27 is decreased when the steering torque T continues to be higher than a predetermined value C3 for a prescribed period of time.

Three embodiments of the present invention according to the second aspect are describe hereinafter.

Figure 5:
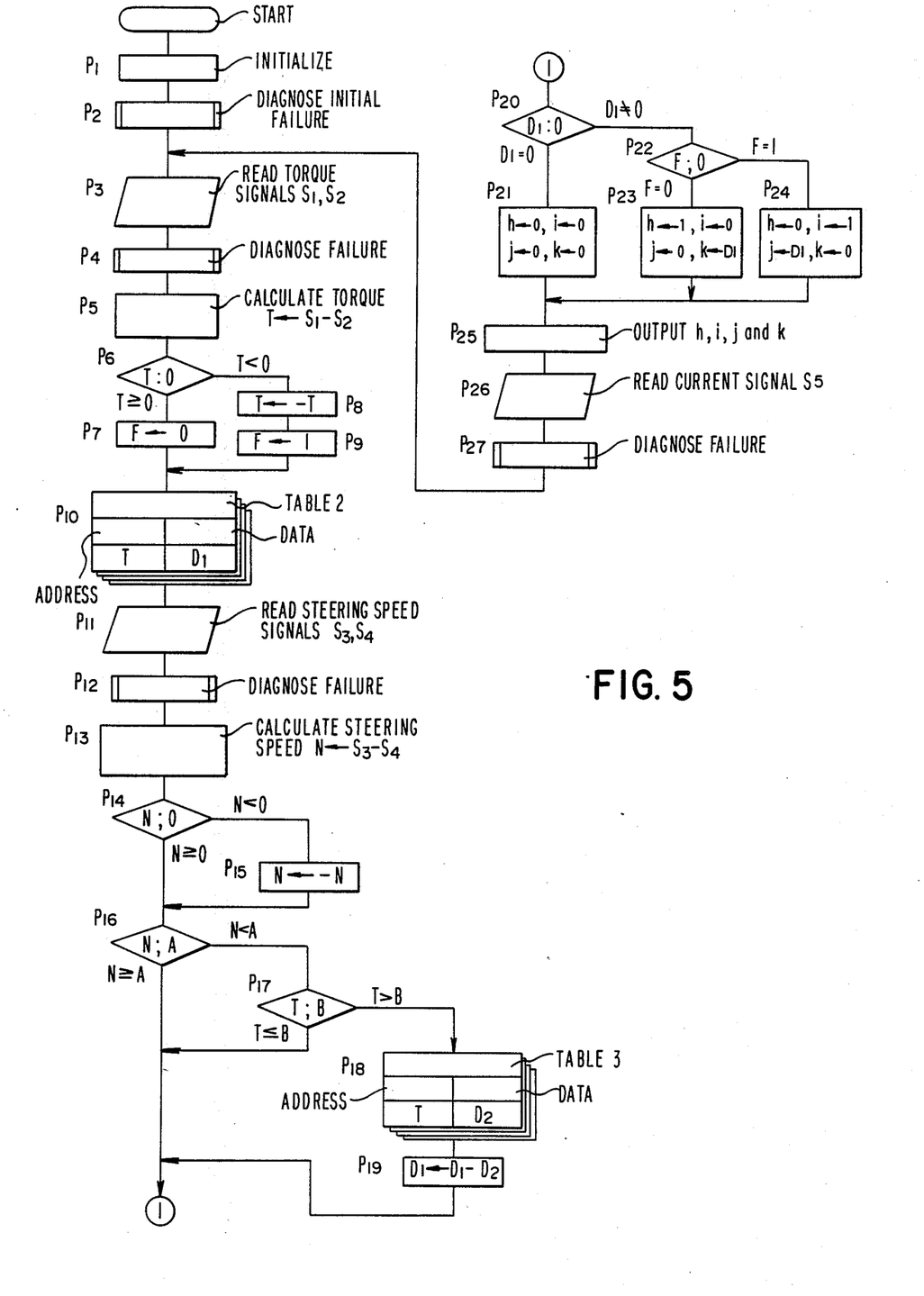
FIG. 5 shows the first embodiment.

FIG. 5 is a flowchart showing a motor-driven power steering unit according to the first embodiment of the second aspect of the present invention. In FIG. 5, the processing in steps P1 to P9 and that in steps P20 to P27 are the same as those in the steps P1 to P9 and in the steps P11 to P18 shown in FIG. 4 and will not be explained hereinafter.

Figure 9:
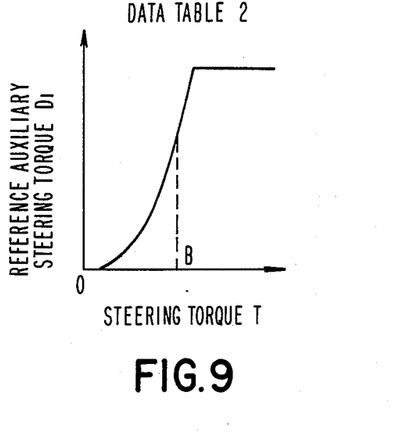

In step P10, a reference auxiliary steering torque D1 is looked up in a data table 2 (see FIG. 9) with the steering torque T being used as an address. As shown in FIG. 9, the reference auxiliary steering torque D1 is determined so that it will produce optimum feeling on steering depending upon the steering torque T. Unlike the reference auxiliary steering torque D1 characterized in FIG. 8, it maintains a constant level in the high steering torque range.

Figure 10:
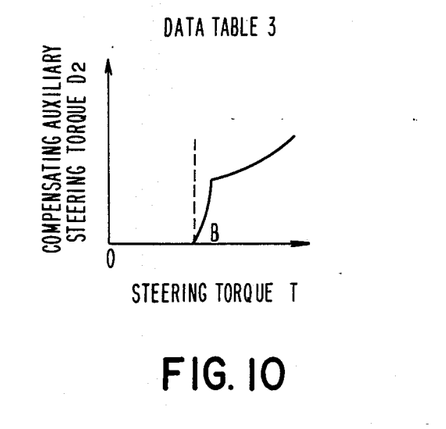
Figure 11:
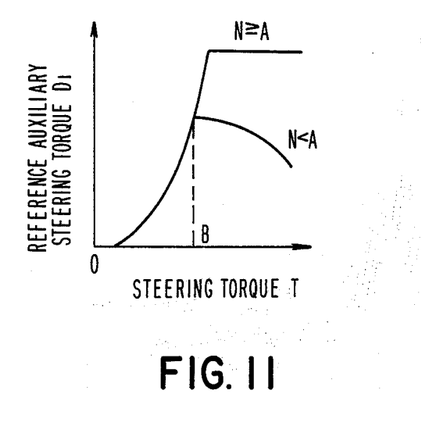

Subsequently, in step P11, the microcomputer circuit 45 reads two output signals S3 and S4 from the tachometer generator 20 and diagnoses any failure in the tachometer generator 20 in accordance with a predetermined subroutine. Only when the tachometer generator 20 is found to be functioning normally in step P12, does the sequence go to step P13. In step P13, the two output signals from the tachometer generator 20 are subjected to a subtraction to generate a signal representing the steering speed N (this signal is hereunder referred to as steering speed N). The steering speed N is either positive or negative depending upon the steering direction, or the direction in which the pinion shaft 14 rotates. The absolute value of this difference signifies the magnitude of the steering speed. Subsequently, in step P14, a decision is made as to whether the steering speed N is positive or negative. If it is negative, the steering speed N is converted to a positive value (its absolute value is taken) in step P15 and the sequence goes to step P16. In step P16, the absolute value of steering speed N is compared with a predetermined value A. If the steering speed N is found to be equal to or greater than the predetermined value A, the sequence goes to step P20 described earlier. If the steering speed N is smaller than the predetermined value A, the sequence goes to step P17. In step P17, a decision is made as to whether the steering torque N is greater than a predetermined value B. If the steering torque T is equal to or smaller than the predetermined value B, the sequence goes to step P20. Otherwise, if the steering torque is larger than value B (T>B), the sequence goes to step P18. In step P18, a compensating auxiliary steering torque D2 is looked up in a data table 3 (see FIG. 10) with the steering torque T being used as an address. An internal signal representing the compensating reference auxiliary steering torque (this signal is hereunder referred to as a compensating auxiliary steering torque D2) is generated. Subsequently, in step P19, the compensating auxiliary steering torque D2 is subtracted from the reference auxiliary steering torque D1 to compensate for the latter D1. As shown by reference to FIG. 11, the compensated reference auxiliary steering torque D1 has a characteristic such that it decreases gradually when the steering speed N is less than the predetermined value A and when the steering torque T is greater than the predetermined value B. Therefore, as a result of processing in subsequent steps P21 to P25, if the steering speed N becomes less than the predetermined value A and if the steering torque T exceeds the predetermined value B, the duty factor of the current being applied to the motor 27 will decrease with an increase in the steering torque T. This offers the advantage of correctly identifying situations that do not require assisting in steering operations such as a) where the wheel is turned in a direction beyond the maximum steering angular position although one of the stoppers 16L and 16R on the rack shaft 12 has contacted either end of the gear-case 11 to bring the rack shaft 12 to its maximum steering angular position, or b) where a vehicle's wheel has become unsteerable since the wheel is stuck in a groove on the road surface. In these cases, the steering unit of the embodiment under discussion reduces the power consumption of the motor 27 and decreases the heat generation from the motor as effectively as in the previous embodiment.

As described above, the motor-driven power steering unit according to the first embodiment of the second aspect of the present invention is capable of correctly identifying the situation that does not require assisting the steering operations such as where the wheel is turned in a direction beyond the maximum steering angular position or where the wheel is turned although a vehicle's wheel cannot be steered. In these cases, the amount of current being applied to the motor 27 is decreased as in the previous embodiment. This is effective not only in reducing the power consumption of the motor 27 but also in preventing other failures such as heat generation from the motor.

Figure 6:
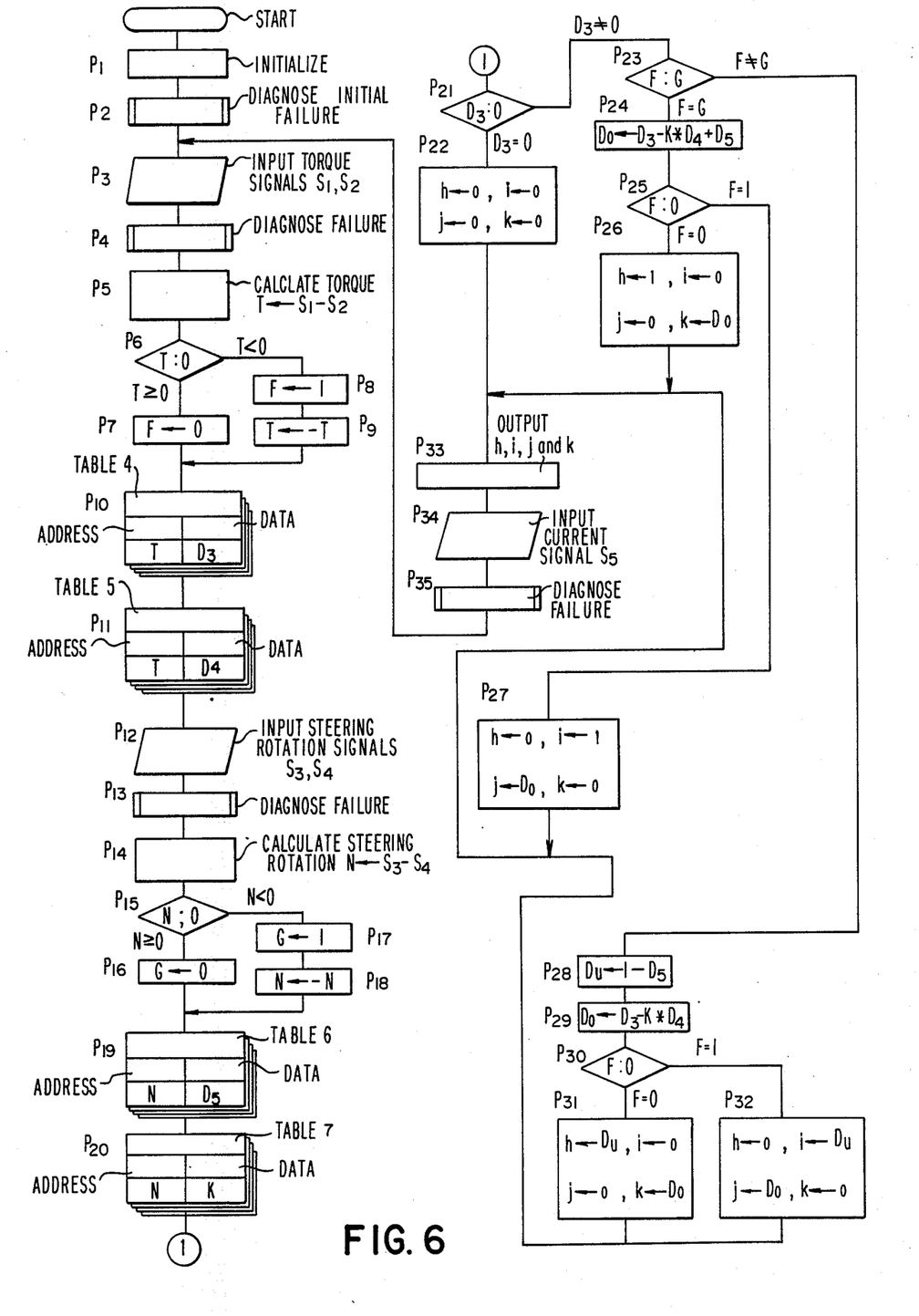
FIG. 6 shows the second embodiment.

FIG. 6 is a flowchart showing a motor-driven power steering unit according to the second embodiment of the second aspect of the present invention. In FIG. 6, steps P1 to P9, steps P12 to P14, and steps P33 to P35 are respectively the same as steps P1 to P9, steps P11 to P13 and steps P25 to P27 in FIG. 5 and will not be explained hereunder.

Figure 12:
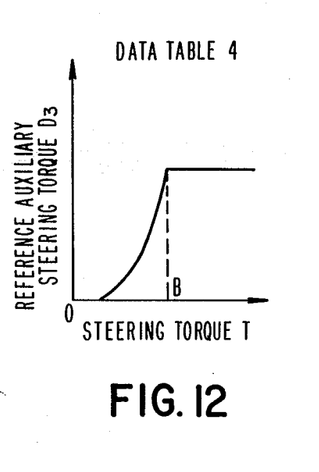
Figure 13:
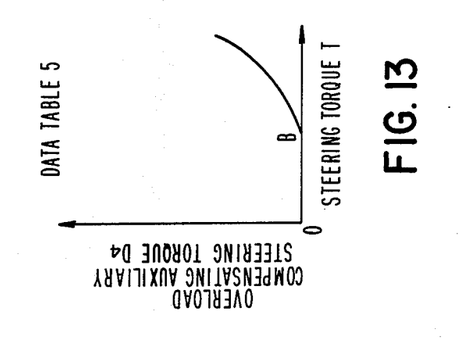

In step P10, a reference auxiliary steering torque D3 is looked up in a data table 4 (see FIG. 12) using the steering torque T as an address. The reference auxiliary steering torque D3 has a characteristic such that it assumes a smaller value in the high steering torque range than the reference auxiliary steering torque D1 in the data table 2 shown in FIG. 9. Subsequently, in step P11, an overload compensating auxiliary steering torque D4 is looked up in a data table 5 (see FIG. 13) using the steering torque T as an address. As it clear from FIG. 13, the overload compensating auxiliary steering torque D4 has a characteristic such that it increases gradually from zero in the range where the steering torque T exceeds a predetermined value B.

Figure 14:
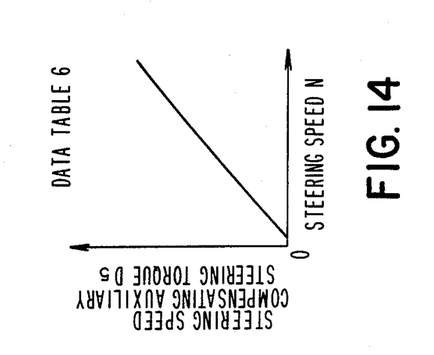
Figure 15:
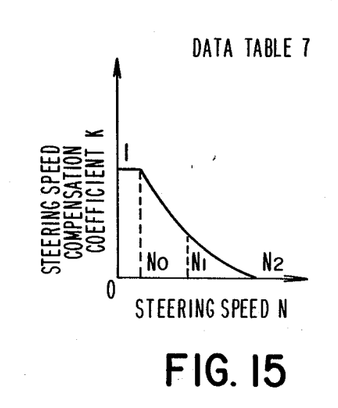

In step P15, a decision is made as to whether the steering speed N is positive or negative. If N is positive or zero, a flag G is set to zero "0" in step P16. If N is negative, the flag G is set to "1" in step P17. At the same time as the flag is set to "1", the sign of the steering speed N is inverted in step P18 to obtain a positive value (absolute value). Flag G indicates the steering direction. The value of flag G corresponds to the value of flag F. Subsequently, in step P19, a steering speed compensating auxiliary steering torque D5 is looked up in a data table 6 (see FIG. 14) using the steering speed N as an address. In step P20, a steering speed compensation coefficient K is looked up in a data table 7 (see FIG. 15) using the steering speed N as an address. The steering speed compensation coefficient K has a characteristic such that it assumes the value "1" when the steering speed N is not greater than a predetermined value $N_0$, and the value "0" when N is not smaller than a predetermined value $N_2$. Between the two predetermined values $N_0$ and $N_2$ (for example, at $N_1$) K gradually decreases.

Subsequently, in step P21, a decision is made as to whether the reference auxiliary steering torque D3 is zero or not zero. If D3 is zero, the duty factors of all PWM signals h, i, j and k are set to zero in step P22. If D3 is not zero, a decision is made as to whether flags F and G are of the same value in step P23. If flags F and G are found to be of the same value in step P23, processing through steps P24 to P27 is performed. If flags F and G are found to be of different values, processing through steps P28 to P32 is performed. In step P24, a target auxiliary steering torque $D_D$ is calculated based upon the reference auxiliary steering torque D3, steering speed compensation coefficient K, overload compensating auxiliary steering torque D4 and steering speed compensating auxiliary steering torque D5. In a subsequent step P25, the value of flag F is identified. If flag F is found to be "0" in step P25, the duty factors PWM signals h, i, j and k are set to values, 1, 0, 0 and $D_D$, respectively, in step P26. If flag F is found to be "1", the duty factors of PWM signals h, i, j and k are set to values 0, 1, $D_D$ and 0, respectively, in step P27.

Figure 16:
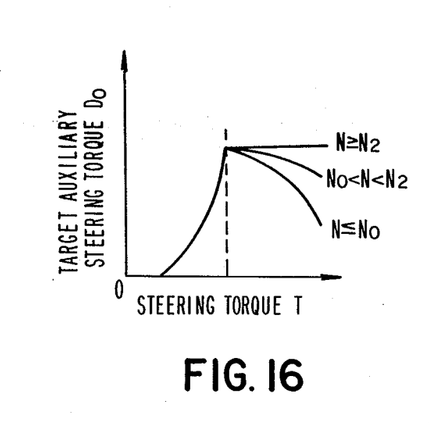

In step P28, an adjusting auxiliary torque $D_U$ is set based upon the steering speed compensating auxiliary steering torque D5. In step P29, a target auxiliary steering torque $D_D$ is calculated based upon the reference auxiliary steering torque D3, steering speed compensation coefficient K and overload compensating auxiliary steering torque D4. As shown by referring to FIG. 16, the characteristic of the target auxiliary steering torque $D_D$, calculated in step P29 and in the already described step P24, changes according to the steering speed N in the high steering torque range (T>B) and decreases as the steering speed N becomes smaller. Therefore, as in the first embodiment already described, the speed embodiment reduces the duty factor of the current applied to the motor 27 in a situation that does not require steering assist such as where the wheel is turned although the vehicle's wheel is unsteerable. As a result, the power consumption of the motor 27 is reduced while suppressing the generation of heat from the motor. As a further advantage, the steering unit of the second embodiment has the ability to correctly identify when there is no need to assist steering.

In a subsequent step P30, the value of flag F is identified as in the already described step P25. If flag F is "0", the duty factors of PWM signals h, i, j and k are set to values $D_U$, 0, 0 and $D_D$, respectively, in step P31. If flag F is "1", duty factors of 0, $D_U$, and 0 are set for PWM signals h, i, j and k, respectively, in step P32.

As described above, the motor-driven power steering unit according to the second embodiment of the second aspect of the present invention, also correctly determines when there is no need to assist in steering so that the duty factor of the current to be applied to the motor 27 is reduced. This results in smaller power consumption and satisfactorily suppresses the generation of heat from the motor 27 and other devices. A particular advantage of this second embodiment is that during a return steering, where the direction of the steering torque is different from the steering direction (i.e., in the case where flags F and G assume different values), the FET Q1 or Q2 is driven in response to the PWM signal $D_U$ and the output of the motor 27 is reduced. This helps to produce a good feeling on steering.

Figure 7:
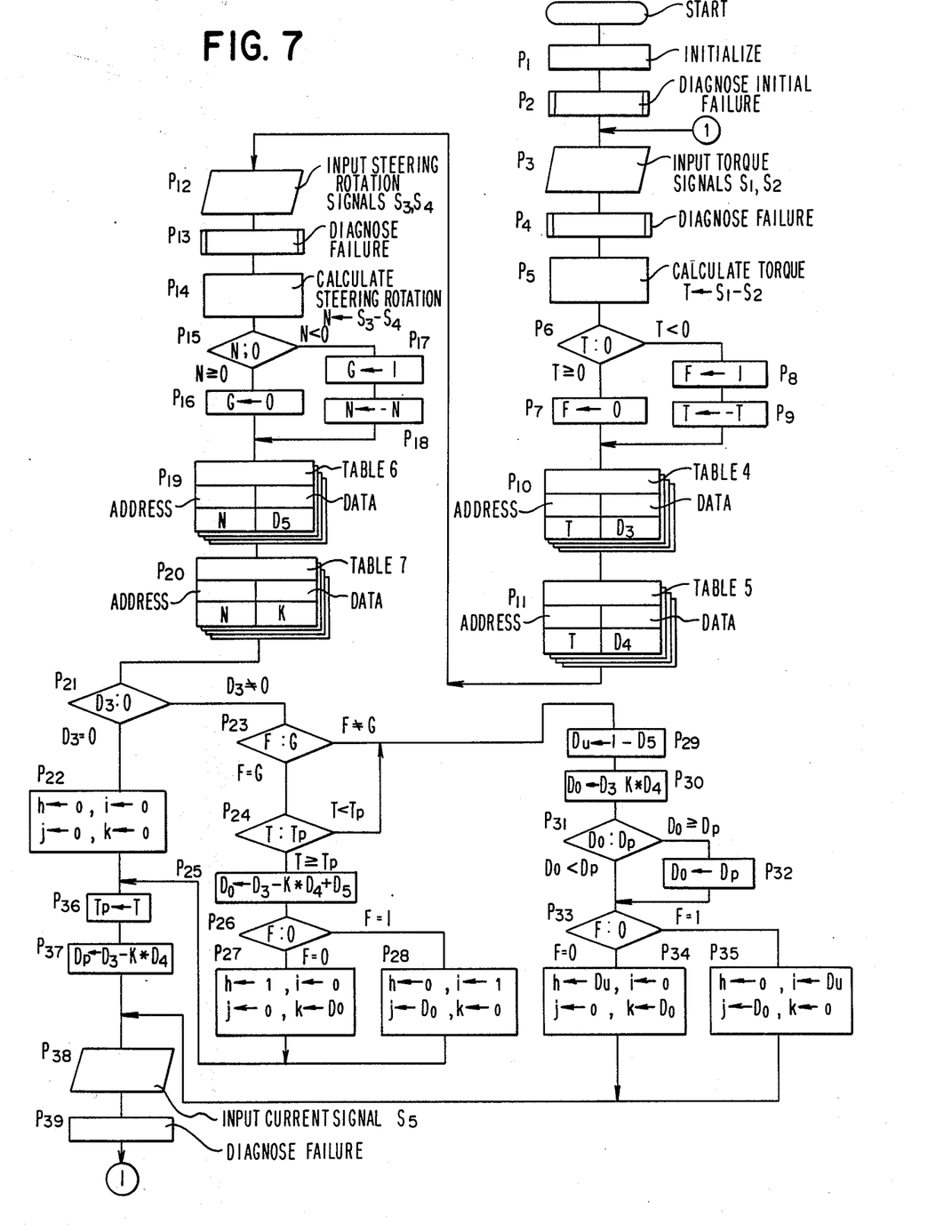
FIG. 7 shows the third embodiment.

FIG. 7 is a flowchart of a motor-driven power steering unit according to the third embodiment of the second aspect of the present invention. The flowchart shown in FIG. 7 is identical to that shown in FIG. 6 except for steps P24, P31, P32, P36 and P37. Therefore, the following description concerns only those steps P24, P31, P32, P36 and P37 and does not cover the other steps.

If flags F and G are found to be of the same value in step P23, a decision is made in step P24 as to whether the steering torque T is equal to or greater than the steering torque $T_P$ detected during the execution of the previous routine (this torque is hereunder referred to as the previous steering torque $T_P$). If the result is affirmative ($T > T_P$)., the target auxiliary steering torque $D_D$ is calculated in step P25. If the steering torque T is smaller than the previous steering torque $T_P$, processing through steps P29 to P35 is performed as in the case where flags F and G are of different values. In step P31, a decision is made as to whether the target auxiliary steering torque $D_D$ is less than the target steering force $D_P$ calculated during the execution of the previous routine (this steering force is hereunder referred to as the previous target steering force $D_P$). If the result is affirmative ($D_D < D_P$), processing through step P33 and subsequent steps is performed as in the previous embodiment. If $D_D > D_P$, the target auxiliary steering torque $D_D$ is set to the previous target steering force $D_P$ in step P32.

After the duty factors of PWM signals h, i, j and k are set in steps P27 and P28 and, the steering torque T detected by the currently executed routine is set to the previous steering torque $T_P$, which is stored in preparation for the execution of the next routine. Subsequently, in step P37, the target steering torque $D_P$ is calculated on the basis of the reference auxiliary steering torque D3, the steering speed compensation coefficient K and overload compensating auxiliary steering torque D4. The calculated target steering torque $D_P$ is stored as the previous target auxiliary steering torque in preparation for execution of the next routine.

Figure 17:
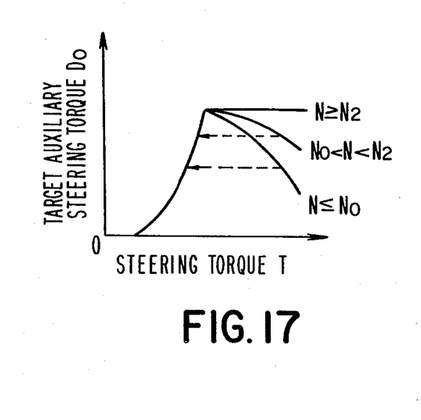

The motor-drive power steering unit according to the third embodiment of the second aspect of the present invention has the following features. When the detected steering torque T is found to be smaller than a previously detected value, control for return steering is performed in steps P29 to P35 so as to reduce the output of the motor 27. In return steering, the duty factor of the current to be applied to the motor 27 is determined on the basis of whichever is smaller of the two values, i.e., the target auxiliary steering torque $D_D$ calculated by the currently executed routine and the previous target auxiliary steering torque $D_P$ calculated by execution of the previous routine. Therefore, if the steering torque T is decreasing, the output of the motor 27 also decreases such as for return steering. If the steering torque T decreases during the return steering, the target auxiliary steering torque $D_D$ is maintained substantially constant as indicated by dashed lines in FIG. 17, thereby producing a better feeling during steering. The steering unit under discussion also has the ability to reduce the power consumption of the motor 27 and suppress the generation of heat from the motor and other devices in every situation that does not require any assisting in steering.

In all of the embodiments described above, the electric current being applied to the motor 27 is reduced if there is no need to assist in steering operations. It is of course possible to cut the current supply to the motor 27 and bring it to a complete stop.

As described on the foregoing pages, the motor-driven power steering unit according to the first aspect of the present invention is able to decrease the amount of current being applied to the motor if the steering force exceeds a predetermined level. The steering unit can be manufactured at a low cost and with a simple composition by making use of already available devices and yet it is able to reduce the power consumption and heat generation of an electric motor and other devices in situations where there is no need to assist in steering operations, such as where the steering force is increased by turning the wheel although a vehicle's wheel is unsteerable.

Besides these advantages, the motor-driven power steering until according to the second aspect of the present invention is able to decrease the amount of current being applied to the motor when the steering force exceeds a predetermined level and if the steering speed is less than a predetermined level. This offers the additional advantage of higher reliability since the situation where there is no need to assist in steering operations can be identified in a more correct way.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What we claim is:

1. A motor-driven power steering unit furnished with an electric motor for generating an auxiliary steering force in a steering system that couples a steering wheel to wheels of a vehicle, said steering unit assisting in the turning of the steering wheel by controlling an electric current to be applied to said electric motor based upon steering information, the motor-driven power steering unit comprising:
   a steering force detecting means for detecting a steering force generated in said steering system; and
   an overload preventing means for decreasing an electric current being applied to said electric motor when the steering force detected with said steering force detecting means exceeds a predetermined value.

2. A motor-driven power steering unit furnished with an electric motor for generating an auxiliary steering force in a steering system that couples a steering wheel to wheels of a vehicle, said steering unit assisting in the turning of the steering wheel by controlling an electric current to be applied to said electric motor based upon steering information, the motor-driven power steering unit comprising:
- a steering force detecting means for detecting a steering force generated in said steering system;
- a steering speed detecting means for detecting a steering speed produced by said steering system; and
- an overload preventing means for decreasing an electric current being applied to said electric motor when the steering force detected with said steering force detecting means exceeds a predetermined value and when the steering speed detected with said steering speed detecting means is not higher than a predetermined value.

* * * * *